United States Patent
O'Neill et al.

(10) Patent No.: US 7,882,346 B2
(45) Date of Patent: Feb. 1, 2011

(54) METHOD AND APPARATUS FOR PROVIDING AUTHENTICATION, AUTHORIZATION AND ACCOUNTING TO ROAMING NODES

(75) Inventors: Alan O'Neill, Henley Beach (AU); Michaela Vanderveen, Tracy, CA (US); George Tsirtsis, London (GB); Vincent Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1025 days.

(21) Appl. No.: 10/435,622

(22) Filed: May 9, 2003

(65) Prior Publication Data

US 2004/0073786 A1    Apr. 15, 2004

Related U.S. Application Data

(60) Provisional application No. 60/418,526, filed on Oct. 15, 2002.

(51) Int. Cl.
*H04L 9/32* (2006.01)
*H04L 29/06* (2006.01)
*H04L 9/00* (2006.01)
*H04K 1/00* (2006.01)
*H04M 1/66* (2006.01)
*H04W 4/00* (2009.01)

(52) U.S. Cl. .............. 713/153; 713/155; 713/171; 713/168; 726/4; 726/7; 380/248; 380/247; 380/277; 455/432.1; 455/433; 455/411

(58) Field of Classification Search ............... 713/153, 713/155, 169, 168, 171; 726/3, 4, 7; 380/277, 380/247, 248; 709/225, 229; 455/432.1, 455/436, 411, 433
See application file for complete search history.

(56) References Cited

U.S. PATENT DOCUMENTS

| 4,679,244 A | 7/1987 | Kawasaki et al. |
| 4,833,701 A | 5/1989 | Comroe et al. |

(Continued)

FOREIGN PATENT DOCUMENTS

CN    1553741    12/2004

(Continued)

OTHER PUBLICATIONS

Aboba et al. "The Network Access Identifier", Request for Comments (RFC) 2486. Jan. 1999. 8 pgs.*

(Continued)

*Primary Examiner*—Zachary A Davis
(74) *Attorney, Agent, or Firm*—Won Tae C Kim (57) ABSTRACT

This invention proposes an integrated process for AAA (Authentication, Authorisation, and Accounting) with the order reversed whereby L2 follows L3. The L3 process treats the wireless link as any normal IP access link, and the L3 authorisation provides L3 processing, but also includes the L2 terminal authentication identifiers so that the L2 security parameters can also be returned. This means that the wireless link and the IP layer are not secured until after the L3 authorisation has completed and therefore the first IP messages that trigger authorisation are sent insecurely. This invention also provides methods to avoid these insecure messages presenting any opportunities to an attacker. Finally, the inventions include methods to enable L3 before L2 authorisation when a user is roaming in a foreign network.

50 Claims, 5 Drawing Sheets

U.S. PATENT DOCUMENTS

| | | | |
|---|---|---|---|
| 4,901,307 A | 2/1990 | Gilhousen et al. | |
| 5,056,109 A | 10/1991 | Gilhousen et al. | |
| 5,095,529 A | 3/1992 | Comroe et al. | |
| 5,128,938 A | 7/1992 | Borras | |
| 5,200,952 A | 4/1993 | Bernstein et al. | |
| 5,210,787 A | 5/1993 | Hayes et al. | |
| 5,229,992 A | 7/1993 | Jurkevich et al. | |
| 5,247,516 A | 9/1993 | Bernstein et al. | |
| 5,251,209 A | 10/1993 | Jurkevich et al. | |
| 5,267,261 A | 11/1993 | Blakeney, II et al. | |
| 5,325,432 A | 6/1994 | Gardeck et al. | |
| 5,333,178 A * | 7/1994 | Norell | 455/461 |
| 5,369,781 A | 11/1994 | Comroe et al. | |
| 5,387,905 A | 2/1995 | Grube et al. | |
| 5,420,909 A | 5/1995 | NG et al. | |
| 5,426,395 A | 6/1995 | Cygan | |
| 5,450,405 A | 9/1995 | Maher et al. | |
| 5,461,645 A | 10/1995 | Ishii | |
| 5,463,617 A | 10/1995 | Grube et al. | |
| 5,465,391 A | 11/1995 | Toyryla | |
| 5,473,605 A | 12/1995 | Grube et al. | |
| 5,491,835 A | 2/1996 | Sasuta et al. | |
| 5,511,232 A | 4/1996 | O'Dea et al. | |
| 5,513,381 A | 4/1996 | Sasuta | |
| 5,542,108 A | 7/1996 | Sasuta | |
| 5,566,366 A | 10/1996 | Russo et al. | |
| 5,572,528 A | 11/1996 | Shuen | |
| 5,590,175 A * | 12/1996 | Gallant et al. | 455/433 |
| 5,590,396 A | 12/1996 | Henry | |
| 5,594,948 A | 1/1997 | Talarmo et al. | |
| 5,625,882 A | 4/1997 | Vook et al. | |
| 5,627,882 A | 5/1997 | Chien et al. | |
| 5,634,197 A | 5/1997 | Paavonen | |
| 5,694,433 A | 12/1997 | Dent | |
| 5,806,007 A | 9/1998 | Raith et al. | |
| 5,884,196 A | 3/1999 | Lekven et al. | |
| 5,898,922 A | 4/1999 | Reininghaus | |
| 5,901,362 A | 5/1999 | Cheung et al. | |
| 5,903,559 A | 5/1999 | Acharya et al. | |
| 5,953,653 A | 9/1999 | Josenhans et al. | |
| 5,987,323 A | 11/1999 | Huotari | |
| 6,011,969 A | 1/2000 | Vargas et al. | |
| 6,021,123 A | 2/2000 | Mimura | |
| 6,021,326 A | 2/2000 | Nguyen | |
| 6,043,707 A | 3/2000 | Budnik | |
| 6,055,236 A | 4/2000 | Nessett et al. | |
| 6,078,575 A | 6/2000 | Dommety et al. | |
| 6,092,111 A | 7/2000 | Scivier et al. | |
| 6,134,226 A | 10/2000 | Reed et al. | |
| 6,144,671 A | 11/2000 | Perinpanathan et al. | |
| 6,160,798 A | 12/2000 | Reed et al. | |
| 6,161,008 A | 12/2000 | Lee et al. | |
| 6,195,705 B1 | 2/2001 | Leung | |
| 6,225,888 B1 | 5/2001 | Juopperi | |
| 6,256,300 B1 | 7/2001 | Ahmed et al. | |
| 6,275,712 B1 | 8/2001 | Gray et al. | |
| 6,285,251 B1 | 9/2001 | Dent et al. | |
| 6,308,080 B1 | 10/2001 | Burt et al. | |
| 6,308,267 B1 | 10/2001 | Gremmelmaier | |
| 6,353,616 B1 | 3/2002 | Elwalid et al. | |
| 6,366,561 B1 | 4/2002 | Bender | |
| 6,366,577 B1 | 4/2002 | Donovan | |
| 6,389,008 B1 * | 5/2002 | Lupien et al. | 370/352 |
| 6,400,703 B1 | 6/2002 | Park et al. | |
| 6,400,722 B1 | 6/2002 | Chuah et al. | |
| 6,430,213 B1 | 8/2002 | Dafesh | |
| 6,434,134 B1 | 8/2002 | La Porta et al. | |
| 6,445,922 B1 * | 9/2002 | Hiller et al. | 455/433 |
| 6,446,127 B1 | 9/2002 | Schuster et al. | |
| 6,463,055 B1 * | 10/2002 | Lupien et al. | 370/353 |
| 6,466,964 B1 | 10/2002 | Leung et al. | |
| 6,477,150 B1 | 11/2002 | Maggenti et al. | |
| 6,487,170 B1 | 11/2002 | Chen et al. | |
| 6,487,407 B2 | 11/2002 | Goldberg et al. | |
| 6,490,564 B1 | 12/2002 | Dodrill et al. | |
| 6,496,505 B2 | 12/2002 | La Porta et al. | |
| 6,496,704 B2 | 12/2002 | Yuan | |
| 6,498,934 B1 | 12/2002 | Muller | |
| 6,505,047 B1 | 1/2003 | Palkisto | |
| 6,510,144 B1 | 1/2003 | Dommety et al. | |
| 6,512,754 B2 | 1/2003 | Feder et al. | |
| 6,519,254 B1 | 2/2003 | Chuah et al. | |
| 6,539,225 B1 | 3/2003 | Lee | |
| 6,546,252 B1 | 4/2003 | Jetzek et al. | |
| 6,563,919 B1 | 5/2003 | Aravamudhan et al. | |
| 6,567,416 B1 | 5/2003 | Chuah | |
| 6,567,664 B1 | 5/2003 | Bergenwall et al. | |
| 6,571,095 B1 | 5/2003 | Koodli | |
| 6,571,289 B1 | 5/2003 | Montenegro | |
| 6,578,085 B1 | 6/2003 | Khalil et al. | |
| 6,584,093 B1 | 6/2003 | Salama et al. | |
| 6,611,506 B1 | 8/2003 | Huang et al. | |
| 6,611,547 B1 | 8/2003 | Rauhala | |
| 6,615,236 B2 | 9/2003 | Donovan et al. | |
| 6,631,122 B1 | 10/2003 | Arunachalam et al. | |
| 6,631,254 B1 | 10/2003 | Wilson et al. | |
| 6,636,498 B1 | 10/2003 | Leung et al. | |
| 6,650,901 B1 | 11/2003 | Schuster et al. | |
| 6,654,363 B1 | 11/2003 | Li et al. | |
| 6,668,166 B1 * | 12/2003 | Kanabar | 455/411 |
| 6,678,735 B1 | 1/2004 | Orton et al. | |
| 6,680,943 B1 | 1/2004 | Gibson et al. | |
| 6,690,936 B1 | 2/2004 | Lundh | |
| 6,708,031 B2 | 3/2004 | Purnadi et al. | |
| 6,724,267 B2 | 4/2004 | Kim | |
| 6,731,932 B1 | 5/2004 | Rune et al. | |
| 6,754,482 B1 | 6/2004 | Torabi | |
| 6,763,007 B1 | 7/2004 | La Porta et al. | |
| 6,785,256 B2 | 8/2004 | O'Neill | |
| 6,879,690 B2 | 4/2005 | Faccin et al. | |
| 6,917,605 B2 | 7/2005 | Kakemizu et al. | |
| 6,947,401 B2 | 9/2005 | El-Malki et al. | |
| 6,954,442 B2 | 10/2005 | Tsirtsis et al. | |
| 6,965,946 B2 | 11/2005 | Inoue et al. | |
| 6,970,445 B2 | 11/2005 | O'Neill et al. | |
| 6,990,339 B2 | 1/2006 | Turanyi et al. | |
| 6,992,994 B2 * | 1/2006 | Das et al. | 370/328 |
| 6,996,379 B2 | 2/2006 | Khorram | |
| 7,068,640 B2 | 6/2006 | Kakemizu et al. | |
| 7,096,014 B2 * | 8/2006 | Haverinen et al. | 455/432.1 |
| 7,110,727 B2 | 9/2006 | Dekker | |
| 7,116,646 B1 | 10/2006 | Gustafson et al. | |
| 7,123,599 B2 | 10/2006 | Yano et al. | |
| 7,133,456 B2 | 11/2006 | Feher | |
| 7,139,548 B2 | 11/2006 | Hayashi et al. | |
| 7,161,913 B2 | 1/2007 | Jung | |
| 7,187,928 B1 | 3/2007 | Senn et al. | |
| 7,257,402 B2 | 8/2007 | Khalil et al. | |
| 7,269,145 B2 | 9/2007 | Koo et al. | |
| 7,292,592 B2 * | 11/2007 | Rune | 370/401 |
| 7,333,452 B2 * | 2/2008 | Lim | 370/331 |
| 7,336,753 B2 | 2/2008 | Hasson et al. | |
| 2001/0036164 A1 | 11/2001 | Kakemizu et al. | |
| 2001/0041571 A1 | 11/2001 | Yuan et al. | |
| 2001/0046223 A1 | 11/2001 | Malki et al. | |
| 2002/0015396 A1 | 2/2002 | Jung | |
| 2002/0018456 A1 | 2/2002 | Kakemizu et al. | |
| 2002/0026527 A1 | 2/2002 | Das et al. | |
| 2002/0068565 A1 | 6/2002 | Purnadi et al. | |
| 2002/0089958 A1 | 7/2002 | Feder et al. | |
| 2002/0114469 A1 * | 8/2002 | Faccin et al. | 380/270 |
| 2002/0136226 A1 | 9/2002 | Christoffel et al. | |
| 2002/0161927 A1 | 10/2002 | Inoue et al. | |
| 2002/0186679 A1 | 12/2002 | Nakatsugawa et al. | |

| | | | |
|---|---|---|---|
| 2002/0191593 | A1 | 12/2002 | O'Neill et al. |
| 2003/0012179 | A1 | 1/2003 | Yano et al. |
| 2003/0051140 | A1 | 3/2003 | Buddhikot et al. |
| 2003/0060199 | A1 | 3/2003 | Khalil et al. |
| 2003/0071417 | A1 | 4/2003 | Nakatsugawa et al. |
| 2003/0092441 | A1 | 5/2003 | Taha |
| 2003/0117969 | A1 | 6/2003 | Koo et al. |
| 2003/0137961 | A1 | 7/2003 | Tsirtsis et al. |
| 2003/0137991 | A1 | 7/2003 | Doshi et al. |
| 2003/0176188 | A1 | 9/2003 | O'Neill |
| 2003/0228868 | A1 | 12/2003 | Turanyi et al. |
| 2004/0037264 | A1 | 2/2004 | Khawand |
| 2005/0014509 | A1 | 1/2005 | Semper et al. |

FOREIGN PATENT DOCUMENTS

| | | |
|---|---|---|
| EP | 1244261 | 9/2002 |
| WO | 95/12297 | 5/1995 |
| WO | 96/27993 | 9/1996 |
| WO | 97/12475 | 4/1997 |
| WO | PCT/US98/47302 | 10/1998 |
| WO | 2006020105 | 2/2006 |

OTHER PUBLICATIONS

PCT International Search Report for International Application No. PCT/US03/32498, Oct. 14, 2003.
Becker et al. RF Power Control in GSM Systems for Constant and Non Constant Envelope Modulation Schemes Proceedings of 2003 Initial Symptoms on Circuits and Systems, ISCAS 2003, vol. 3, pp. III-602 to III-605.
Liang et al: "Nonlinear amplifier Effects in Communications Systems," IEEE Trans. On Microwave Theory and Techniques, vol. 47, No. 8, Aug. 1999, pp. 1461-1466.
C. Perkins, Editor "IP Mobility Support", Network Working Group, pp. 1-79 (Oct. 1996).
Li, Yalun "Protocol Architecture for Universal Personal Computing" IEEE Journal on Selected Areas in Communications 15(8): 1467-1476 (1997).
IETF, Network Working Group, Request for Comments: 2205, Resource Reservation Protocol (RSVP)—Version 1 Functional Specification, pp. 1-105 (Sep. 1997).
IETF, Network Working Group, Request for Comments: 2206, RSVP Management Informatin Base Using SMIv2, pp. 1-60 (Sep. 1997).
IETF, Network Working Group, Request for Comments: 2207, RSVP Extension for IPSEC Data Flows, pp. 1-14 (Sep. 1997).
IETF, Network Working Group, Request for Comments: 2210, The Use of RSVP with IETF Integrated Services, pp. 1-31 (Sep. 1997).
IETF, Network Working Group, Request for Comments: 2208, Resource Reservation Protocol (RSVP) Version 1 Applicability Statement Some Guidelines on Deployment, pp. 1-6 (Sep. 1997).
IETF, Network Working Group, Request for Comments: 2209, Resource Reservation Protocol (RSVP)—Version 1 Message Processing Rules, pp. 1-24 (Sep. 1997).
J. Moy, Editor, "OSPF Version 2", Network Working Group, pp. 1-244 (Apr. 1998).
Valko, Andras "Cellular IP: A New Approach to Internet Host Mobility" Computer Communications Review 29(1): 50-65 (1999).
Andras G. Valko, "Cellular IP—A New Approach to Internet Host Mobility," ACM Computer Communication Review, vol. 29, No. 1, pp. 50-65, Jan. 1999.
TIA/EIA/IS-707A.8 "Data Service Options for Spread Spectrum Systems: Radio Link Protocol Type 2" pp. 1-1:4:12 (Mar. 1999).
Karagiannis, Mobile IP, State of the Art Report, pp. 1-63, Jul. 1999.
Elin Wedlund et al., "Mobility Support Using SIP", Proc. Of ACM/IEEE International Conference on Wireless and Mobile Multimedia (WoWMoM '99), Seattle, Washington, Aug. 1999.
Henning Schulzrinne et al., "Application-Layer Mobility Using SIP", 0/7803-7133 IEEE, pp. 29-36, Jan. 2000.
"Source Specific Multicast (SSM) Explicit Multicast (Xcast)" pp. 1-27 (Copyright 2001 by ETRI).
IETF Network Working Group, Request for Comments: 2961, RSVP Refresh Overhead Reduction Extensions, pp. 1-32 (Apr. 2001).
Marshall, W., et al., Integration of Resource Management and SIP, IETF Internet Draft, draft-ietf-sip-manyfolks-resource-02.txt, Aug. 2001, pp. 1-28.
Andrew T. Campbell et al., "IP Micro-Mobility Protocols", ACM SIGMOBILE Mobile Computer and Communication Review (MC2R), vol. 4, No. 4, pp. 34-54, Oct. 2001.
S. Zhou et al., "A Location Management Scheme for Support Mobility in Wireless IP Networks Using Session Initiation Protocol (SIP)", 1531-2216/01 IEEE, Oct. 2001, pp. 486-491.
Bos, L., et al., A Framework for End-to-End Perceived Quality of Service Negotiation, IETF Internet Draft, draft-bos-mmusic-sdpqos-framework-00.txt, Nov. 2001, pp. 1-22.
Papalilo, D., et al., Extending SIP for QoS Support www.coritel.it/publications/IP_download/papalilo-salsano-veltri.pdf, Dec. 8, 2001, pp. 1-6.
Camarillo, P., et al., Integration of Resource Management and SIP, IETF Internet Draft, draft-ietf-sip-manyfolks-resource-04.ps, Feb. 25, 2002 pp. 1-18.
Ho, Integration AAA with Mobile IPv4, Internet Draft, pp. 1-59, Apr. 2002.
"SIP: Session Initiation Protocol", IETF Network Wording Group, Request for Comments: 3261, (Jun. 2002), pp. 1-29.
IETF, Network Working Group, Request for Comments: 3261 "SIP: Session Initiation Protocol", pp. 1-269 (printed as pp. 1-252) (Jun. 2002).
Network Working Group, IPv6 Prefix Delegation Using ICMPv6, pp. 1-33, Apr. 2004.
IETF Mobile IP Working Group, "Mobility Support in IPv6", D. Johnson, Rice University, C. Perkins, Nokia Research Center, J. Arkko, Ericsson; Feb. 26, 2003, downloaded from http://www.join.uni-muenster.de on Dec. 29, 2004, pp. 1-158.
Network Working Group, "IP Mobility Support for IPv4", C. Perkins, Ed., Nokia Research Center, Jan. 2002, downloaded from http://www.ietf.org on Dec. 29, 2004, pp. 1-92.
International Search Report - PCT/US03/032498, International Search Authority - European Patent Office - Mar. 9, 2004.

\* cited by examiner

METHOD AND APPARATUS FOR PROVIDING AUTHENTICATION, AUTHORIZATION AND ACCOUNTING TO ROAMING NODES

RELATED APPLICATIONS

The present application claims the benefit of U.S. Provisional Patent Application Ser. No. 60/418,526 filed Oct. 15, 2002 titled "METHODS AND APPARATUS TO SECURE A COMMUNICATIONS ACCESS LINK AND MOBILITY SESSION IN A FOREIGN NETWORK" which is hereby expressly incorporated by reference.

FIELD OF THE INVENTION

The present invention is directed to methods and apparatus for providing authentication, authorization and accounting services to mobile nodes which are located in a foreign network domain.

BACKGROUND

Internet AAA systems provide Authentication, Authorisation and Accounting (AAA) for Internet Service Providers (ISPs) so that End Nodes (ENs) and/or their users can be identified, and given access to a controlled set of service capabilities for which consumption can then be measured. End nodes may be, e.g., fixed devices such as desk top PCs or mobile devices such as PDAs and/or portable computers which may connect to a network via a wireless communications link. End nodes and their corresponding users are normally identified by a network access identifier (NAI). While in their home domain, Internet service is normally provided to an end node from a home ISP which uses a first, e.g., home, AAA system. The AAA system typically includes a AAA server that is used to provide AAA functionality.

The Internet AAA architecture has a roaming capability whereby a user outside his home domain can obtain service from a second, e.g., foreign, ISP who has a business relationship either with the home ISP or a third party broker/settlement system. The user is authenticated and authorized by the home ISP, so that the foreign ISP can generate accounting records and receive payment for the service provided to the roaming user. Roaming is facilitated by the user providing its Network Access Identifier (NAI), e.g., username@realm such as john_smith@home_ISP.com, to the foreign ISP. The second ISP uses the NAI realm for AAA routing, to identify the target AAA system of the home ISP and to then proxy the AAA request for the user authentication to the identified AAA system, potentially via a third AAA system corresponding to a broker. This AAA proxying relies on security associations that are in place between the home and foreign ISPs, or between the third settlement service and both the home and foreign ISPs, to secure the AAA transactions that flow between the home and foreign ISPs. For the purpose of authentication with the home AAA server, the user and its home AAA server share a secret that is used in combination with its NAI. The shared secret may be stored in the home AAA server and the user device and is accessed, as needed, for use in performing authentication and/or encryption/decryption functions.

Since the foreign AAA system has no knowledge of the user's NAI, it simply passes the Access_Request to the home AAA and receives back an access response (accept/reject). If the access response is accept, e.g., an Access_Accept, the response constitutes a commitment by the home AAA system that the charges incurred by the user will be met. Specifically, the user normally does not at any time have a user account created in the database of the foreign AAA (AAAF) and there is no need for the user and AAAF to have any form of shared secret. This is because the user requires only a single shot authorization provided by the home AAA system and is subsequently granted connectivity. This model however is insufficient if various additional services are to be consumed in the foreign domain by the user for which either unilateral or mutual authentication with the foreign domain is required. This is because in the described system a shared secret is only available in the home AAA system (AAAH) and is therefore unavailable in the AAAF, i.e. there is no shared secret present between the AAAF and the user device. For example, if link layer encryption keys need to be derived for security/privacy reasons then, with the existing model, these keys can only be derived by the home AAA system although the communication links used belong to the foreign AAA system where the user happens to be. Other security associations between the user and the foreign network may also be needed such as security associations with application specific servers like Session signalling servers, mobility agents, paging agents etc. The inability of the AAAF to perform authentication/authorization is limiting and can interfere with the ability to provide service to a node visiting a foreign domain.

We note here that if the foreign (or home) wireless network were to use a public key infrastructure for its security needs, then there would be no need for a shared secret between the user and the AAAF: instead, a certification authority would vouch for the public keys of the user and the AAAF. It is well known in the art that the public key system is computationally burdensome for power-limited wireless devices, and thus it is rarely employed in real-life wireless networks.

Based upon the above discussion, it is clear that a need exists for a better AAA system and method to satisfy the security needs of wireless networks, particularly concerning how security is handled between home and foreign domains during roaming.

SUMMARY OF THE INVENTION

The present invention is directed to methods and apparatus for supporting authentication, authorization and/or accounting operations in both home and foreign network domains. The methods and apparatus of the present invention are well suited for use with mobile devices, e.g., mobile end nodes, and cellular systems. The techniques of the present invention utilize security systems, e.g., AAA systems, in each of the home and foreign domains to avoid the need and overhead of a public key infrastructure to service the security needs associated with providing services to mobile devices.

A home AAA system is located in a home domain, e.g., home network, while a foreign AAA system is located in a foreign domain, e.g., foreign network. The home and foreign AAA systems are coupled together in a secure manner so that they can communicate in a reliable and secure manner.

Various features of the invention are directed to separating security between the user and the home AAA system from security between the user and a foreign AAA system, after an initial authentication operation involving the home AAA system. Following the initial authentication operation, the methods of the present invention provide the foreign AAA system and the user with a dynamically generated shared secret, from which other keys can be generated for communications in the foreign domain. The dynamically generated shared secret can be used by the foreign AAA system and visiting end node to support additional authentication and/or authorization operations which may take place in the foreign domain as additional services are requested. In accordance with one feature of the invention, a second NAI associated with the end node may be generated and assigned as part of the initial authentication and authorization process. The generated NAI is associated with the generated shared secret by both the user end node and the AAA system in the foreign network. The assigned NAI is used by the end node in the foreign domain when requesting additional services.

To gain network access, an end node needs to be authenticated to the network. In accordance with the present invention, sometimes it is considered to be the end node itself that authenticates and some other times it is considered to be the user of the end node that authenticates. In accordance with another feature of the invention, it is also possible that the user authentication information is placed in a given end node so that the end node can authenticate on behalf of the user automatically. Any of the various above discussed alternatives may be used in accordance with the present invention. The end node can be a fixed or a mobile node e.g.: a mobile terminal.

A home cellular operator can use its AAA system to authenticate an end node, e.g., a Mobile Terminal (MT), and authorise service capabilities. If the user is seeking access to the system, then the user sends some form of 'connect' message from the Mobile Terminal to the access node, e.g., an access router, which itself triggers an Access_Request message to the local AAA server. The 'connect' message includes the username and realm of that user in the form of a homeNAI to facilitate AAA routing. The Access_Request to the AAA should also include the access interface type and/or access router type, so that the AAA system understands what interface-specific home AAA processing to apply to that Access_Request and what specific parameters should be returned in the Access_Accept. When in a foreign domain the foreign AAA server proxies the Access_Request acting as an intermediary between the end node and the home AAA server.

The user and home AAA server share a root key, e.g., value, having a predetermined format, that is provided as part of service creation. This root key is not shared with the foreign AAA server. The root key can be used by the home AAA server for an Extensible Authentication Protocol (EAP)-based mutual authentication between the Mobile Terminal and the AAA server. The EAP based authentication is triggered by an Access_Request comprising of a username and access link type. During the EAP mutual authentication, the user device (end node) and the home AAA system (AAAH), e.g., server, generate a Home Session (HS) key that is subsequently used to undertake any additional security procedures with the AAAH during the lifetime of that session key. The HS key is used to derive subsequent keys, which can be used for security processes. The root key normally is not itself used directly for securing communications, in order to limit exposure of the root key, which would otherwise offer opportunities for security analysis, and hence the potential compromise of the root key over time.

The lifetime of the HS key may be pre-defined as a result of the root key length and/or entropy EAP method details, HS key usage and the threat model. The operator, through network management procedures, may adjust this lifetime and it is the responsibility of the MT to manage the HS key and refresh it as required by the MT usage of that key. Optionally/alternatively, some of the HS key management can be off-loaded to the AAAH server, such as in the case where with each EAP mutual authentication, the AAAH forces the derivation of a new HS key.

An example of EAP-based mutual authentication procedure would employ a challenge, RandS, from the AAAH Server to which the Mobile Terminal replies with a response, RespM, and its own challenge, RandM. The AAAH then issues its response, RespS to the Mobile Terminal challenge, RandM. The Mobile Terminal and AAAH use the following algorithms to calculate the required responses and the resulting HS key, and to mutually authenticate each other.

$$HS=PRF\{RandS|RandM, root\ key\}$$

$$RespS, RespM=PRF\{RandS|RandM, HS\}$$

where the | indicates concatenation and the PRF is any keyed one-way pseudo-random function, e.g., HMAC, taking Msg and Key to produce Output=PRF (Msg, Key). If the user is in the home domain then the completion of the mutual authentication leads to the derivation of security parameters in the Home Authentication Server (potentially part of the AAAH) to secure the basic facilities to be used by the user such as the access link security and other keys.

If the user is in a foreign domain then it is the air-link and other facilities in the foreign domain that should be secured. The processes and protocols for undertaking this are a matter for the foreign domain and therefore should be conducted under the control of the foreign AAA system (AAAF), e.g., foreign AAA server. This is done so that multiple Mobile Terminals, air-link and fixed link technologies can be supported under the same overall authentication model. In accordance with the invention, the AAAF should, and is provided with, access to a secret shared with the Mobile Terminal so that subsequent security parameters can be securely and efficiently derived. The derivation of this shared secret is a matter for standardisation as it will be undertaken between AAA domains (foreign and home) and should be applicable to multiple access technologies. In this discussion of the invention, the shared secret, generated for use by the AAAF from information, e.g., the HS key, is called the Roaming Session (RS) key. In an exemplary embodiment, the RS key is derived indirectly from the HS key and has a lifetime no greater than, and often less than, the lifetime of the HS key from which it is generated.

The AAAH can determine whether or not the user is in the home domain by the originator and contents of an Access_Request. For example, the AAAH can determine if the Access_Request has been proxied by a AAAF and is from a AAAF providing a MT identifier used to indicate the mobile associated with the request. In one embodiment of this invention, if the MT is in a foreign domain, then the Access_Request will have traversed the AAAF and the AAAF will add a new Attribute—Value Pair AVP requesting a Roaming Session (RS) key. In an alternative embodiment, the AAAH returns an RS key to the AAAF when the Access_Request indicates a roaming user based on policy without the need for specific request for such a key. While roaming, mutual authentication of the MT and the AAAH should still take place. In one embodiment of the invention, if the MT is roaming, and the AAAH knows it supports RS key derivation, then during the subsequent EAP based mutual authentication between the MT and the AAAH, the MT and AAAH derive the RS key via the mutual authentication based on the HS key. This is the additional RS key in the equations below corresponding to an exemplary embodiment of the present invention.

$$RS, RespS, RespM=PRF\{RandS|RandM, HS\}$$

The RS key has a lifetime equal to, or less than, that of the HS key and is securely transferred to the AAAF, using the AAAH-AAAF Security Association (SA), in a new and novel AVP containing both the RS key and its lifetime. In one embodiment of the invention the AAAH, may then discard the RS key. If the MT or AAAH is not capable, or willing, to derive the RS key then the AAAF is informed of this fact in the access response message sent back from the AAAH.

According to this present invention if an Access_Accept received by a AAAF includes an RS key and, optionally, lifetime information indicating the key lifetime, then the AAAF creates an account, e.g., a temporary account, for the roaming user in the AAAF database. The username@home realm is stored in the database along with the RS key and the profile of the MT also returned in the Access_Accept. The RS key is known to the AAAH. In one particular embodiment of this invention the AAAF considers it as being unsuitable, for policy reasons, to be used directly to secure the communication between service elements in the foreign domain. In such a case, the AAAF undertakes its own EAP-based mutual authentication with the Mobile Terminal, to derive a Foreign Session (FS) key from the RS shared key, both of which are now known to the Mobile Terminal and the AAAF. While the shared secret for the mutual authentication is the RS, the resulting FS key is not known to the AAAH making it suitable for use in the AAAF from a policy standpoint. In one embodiment of the invention, the EAP mutual authentication is the same as, or similar to, that conducted with the AAAH but with different RandM, RandS and root key inputs. The authentication may be as follows:

$$FS=PRF\{RandS|RandM,RS\}$$

$$RespS,RespM=PRF\{RandS|RandM,FS\}$$

In other embodiments of the invention, a different EAP method is used in the MT to AAAF EAP exchange used to generate the FS key from the RS key from the one used in a MT to AAAH EAP exchange.

In one embodiment of the invention, the FS key and lifetime are stored by the AAAF so that it can be used as a shared foreign secret for additional security processes in the foreign domain with the Mobile Terminal. The Mobile Terminal then has a shared secret with both the AAAH and the AAAF that is only known to each specific Authentication Server.

In an exemplary embodiment, the lifetime of the FS key is by default equal to that of the HS and RS keys and once the FS is derived then the RS key is no longer required and may be forgotten, e.g., deleted, by the AAAF and the Mobile Terminal. However, in some implementations the FS key lifetime is made to be significantly smaller than the HS or RS lifetimes so that the AAAF can force the MT to periodically, repeat the EAP mutual authentication with the AAAF. In such cases the RS key should be, and is, kept by the AAAF and mobile node.

A default lifetime of the temporary account for clean-up purposes, used to store the RS and/or FS keys, and the homeNAI and tempNAI, is the remaining lifetime of the RS or FS key. The account lifetime can be a fixed time under policy control of the AAAF with the remaining lifetime transferred to the access node, e.g. access router (AR) in the MT profile, or it can be as long as the current access session as required by the user, with temporary account clean-up being triggered by the session termination indication within a AAA message from an access node, e.g. AR. However, the default lifetime is still required to deal with the loss of such AAA messages due to, e.g., an access router failure for instance. The MT profile can include temporary account management information, which indicates how the AAAH wishes the AAAF to manage the users account. For example, the AAAH may wish the temporary account to last for a specific bounded period of time, a specific number of bytes, until a certain credit limit is reached or until an absolute date and time is passed. The MT profile can also include a maximal interval within the temporary account lifetime for which the MT profile does not need to be updated. This can be used to create medium term temporary accounts that avoid the repeated transfer of the MT profile and account management information when the Mobile Terminal is with a foreign operator for a sustained period of time, such as is likely with international roaming. Such management on the MT profile also avoids the need for the AAAF to incrementally transfer accounting records to the AAAH whilst the user is within accounting limits agreed between the AAAH and AAAF. This therefore ensures that the AAAH does not lose account control during the existence of the temporary account. The Mobile Terminal then simply needs to ensure it undertakes periodic mutual authentications, or on each access invocation, during the account lifetime to ensure that the HS and FS keys are valid. To deal with all these scenarios, the MT has knowledge of, e.g., shares, the account management policy in the AAAH, and the AAAF is able to return the account 'lifetime' to the access router and the MT via the Access_Accept message. The access router can then know when to terminate the access session and the MT can appreciate why and under what policy the access session and temporary account were terminated.

In either case, the FS key has a lifetime no greater than the lifetime of the home secret and therefore as the expiry of the HS key approaches then the Mobile Terminal should undergo a mutual authentication with the AAAH and regenerate the HS, RS and FS session keys using, e.g., the same procedure detailed above. In one embodiment of this invention this procedure is MT-initiated. In such an embodiment it is a MT message that triggers the start of the authentication task.

In some embodiments of this invention the foreign domain may not wish to generate the FS key. In such embodiments the RS key is used as the FS key. One or more foreign domain security keys may then be derived from the RS key which serves as the FS key.

The derivation, lifetime and use of the RS and FS keys from a protocol perspective are issues local to the foreign domain and may be of little or no concern to the home domain.

As already discussed, according to this present invention the AAAF may generate a temporary NAI for the user so that the user can trigger AAA functions both with its home and foreign domain. This tempNAI provides subsequent privacy to the user when included in protocol messages. In one embodiment of this invention, the username is a unique name in the whole of the foreign domain. In an exemplary embodiment, the unique user name is the unique link layer address of the MT (e.g.: its EUI64); in another embodiment it is the MT's home NAI coded (username%home_realm). Yet in another embodiment, it is a randomly generated username that includes a number, e.g., an increasing number, such as one representing time. In the above embodiments, the realm of the tempNAI is the realm of the foreign operator and hence the new user account is stored in the database of the foreign operator that can be accessed by any AAAF in the said operator domain.

In an alternative embodiment of the invention the username part of the tempNAI would be allocated out of a unique sequence number within each Foreign Authentication Server (AAAF) with each AAAF having its own unique realm within the foreign domain e.g.: <unique in AAAF number@AAAF specific realm>. It also provides a level of indirection and aggregation between the wide-range of home NAIs. Other more structured user namespaces can be envisaged to enable temporary users from the same corporate customer or Mobile Virtual Network Operator to have a username field that includes the 'group' name, plus a sequence number space for use by that group, and also to clearly identify the service level of the user. All that is required from the namespace is that uniqueness of the username and the realm in tempNAIs is assured, whilst providing flexibility to the foreign operator over the privacy and grouping features of the temporary namespace.

In one embodiment of this invention, the AAAF keeps both the home and tempNAIs in the temporary account to assist with AAA routing and fraud prevention, as well for account and fault correlation due to the re-use of tempNAIs between different homeNAIs overtime. In such an implementation, the AAAF system therefore also keeps the start and stop time of the temporary account, along with the matching homeNAI. This information can be transferred into off-line long-term storage when the account is closed or the information can be provided to the home AAA system for inter-operator billing.

In various embodiments, once generated, the tempNAI is also returned to the MT so it can use either the tempNAI or homeNAI in its service invocations and updates with the home or foreign domain where assistance from the AAA system is required. In other embodiments, the MT generates its tempNAI in the same manner that the AAAF system generates the tempNAI. In one embodiment of the invention the tempNAI is generated by the AAAF and delivered to the MT in the last EAP message of the EAP session between the MT and the AAAH. In this case, the AAAH returns the last EAP message encapsulated in the AAA Access_Accept and thus the AAAF intercepts it and adds the locally generated tempNAI. The Access_Accept is then sent to the Access Router which decapsulates the EAP message and the new tempNAI and delivers it to the MT.

In one embodiment of this invention, if the user includes its homeNAI in a message to the access router located in the foreign domain along with a MT-AAAH authenticator, then that triggers a AAAF request but the message will be onward routed through the AAAF to the AAAH. The AAAF compares the homeNAI to its roaming database entries to see if this is a new or existing roaming MT, and whether or not a new RS key needs to be derived. Note that having the RS and HS key lifetimes the same implies that the RS key derivation also triggers a HS key regeneration through the EAP mutual authentication with the AAAH. If the user instead includes the tempNAI and a newly defined MT-AAAF authenticator, then the AAA request will instead be handled by the AAAF, as if the MT was at home. If the MT includes the homeNAI but the access router needs AAA support from the AAAF, then the access router can add the tempNAI into the AAA message to enable the AAAF to process the message and avoid the routing via the AAAH. Additionally, if the MT includes the tempNAI but the AR or AAAF needs assistance from the AAAH then the AR or AAAF can add the homeNAI into the AAA request and forward to the AAAH before undertaking its own processing when the AAA reply returns from the AAAH.

In an alternative embodiment of this invention, if the MT requests access with the homeNAI, the whole process is repeated i.e.: an EAP session takes place between the MT and the AAAH, the RS key generated and returned to AAAF and a new account is generated in the AAAF domain. The old AAAF account for the user, if it still exists, will naturally timeout when the old RS key expires. If the tempNAI is used then the EAP exchange takes place between the MT and the AAAF and the AAAH is not involved provided that the RS key is still valid. If not, the AAAF rejects the access request and forces the MT to request access using the homeNAI and thus repeat the initial process and create a new account in the foreign domain.

Once the foreign secret key, e.g., the RS or FS key, is in place, then the AAAF is able to use that secret key, that is shared with the Mobile Terminal, to derive security keys for the foreign domain infrastructure and service elements.

DETAILED DESCRIPTION

Figure 1:
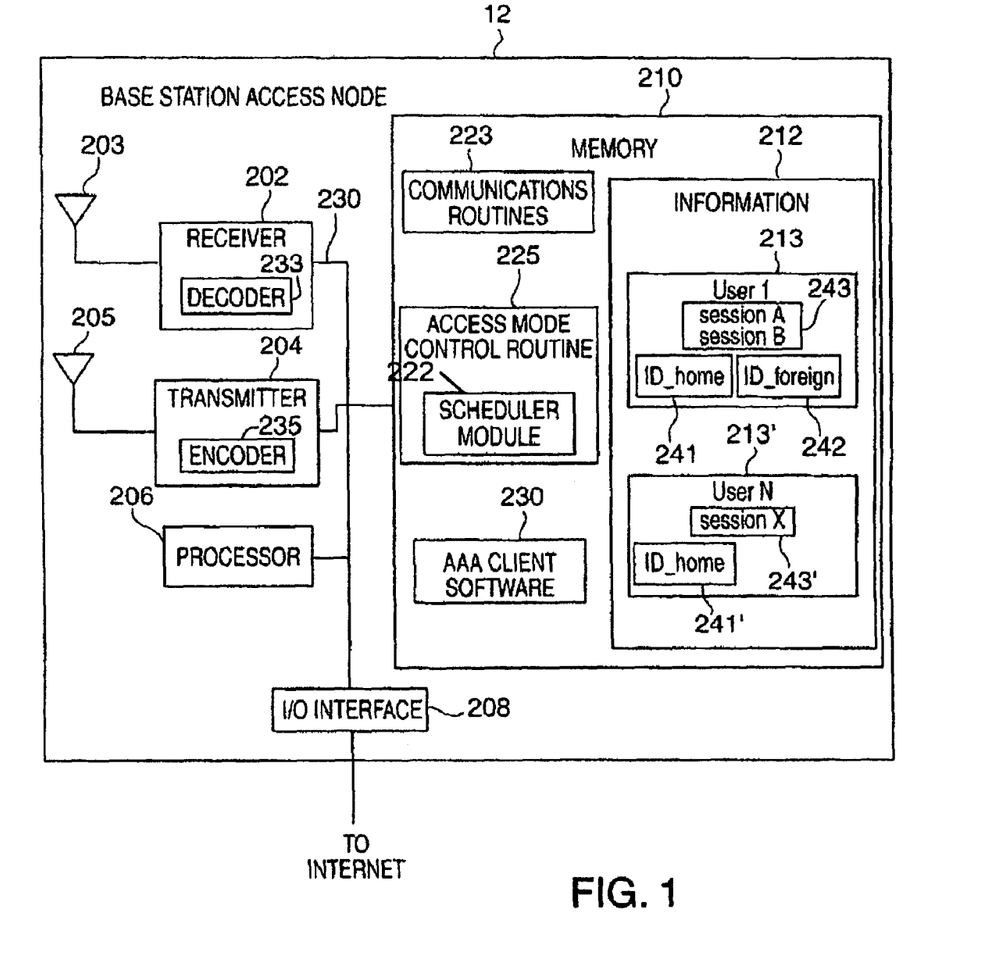
FIG. 1 illustrates an exemplary access node implemented in accordance with the present invention.

FIG. 1 illustrates an exemplary access node, e.g., access router or base station 12, implemented in accordance with the invention. The access node 12 includes antennas 203, 205 and corresponding receiver, transmitter circuitry 202, 204, respectively. The receiver circuitry 202 includes a decoder 233 while the transmitter circuitry 204 includes an encoder 235. The circuitry 202, 204 is coupled by a bus 230 to an I/O interface 208, a processor (e.g., CPU) 206 and memory 210. The I/O interface 208 couples the base station 12 to the Internet. The memory 210 includes routines, which when executed by the processor 206, cause the access node 12 to operate in accordance with the invention. Memory includes communications routines 223 used for controlling the access node 12 to perform various communications operations and implement various communications protocols. The memory 210 also includes an access node control routine 225 used to control the access node's 12, e.g. base station's, operation and signalling to implement the steps of the method of the present invention. The access node control routine 225 includes a scheduler module 222 used to control transmission scheduling and/or communication resource allocation. Thus, module 222 may serve as a scheduler. The memory 210 also includes a AAA client software module 230 used to control end node access to the network via said access node 12 via authentication, authorization and accounting routines. AAA client software module 230 operates in accordance with this invention described in detailed below. Memory 210 also includes information 212 used by communications routines 223, control routine 225, and AAA client software routine 230. The information 212 includes an entry 213, 213' for each active end node user, which includes a list of the active sessions 243, 243' being conducted by the user and includes information identifying the end node being used by a user to conduct the sessions. In particular, information for user 1 213 includes active session list 243, listing exemplary sessions A and B, ID_home 241 and ID_foreign 242. The presence of both home and foreign IDs 241, 242 indicates that the user 1 end node, e.g., MT, is a visiting end node that belongs to a domain different from the domain of access node 12. ID_home 241 and ID_foreign 242 are typically in the form of Network Access Identifiers (NAIs). Information about user N 213' as depicted in FIG. 1 includes ID_home 241', but does not include an ID_foreign, indicating an end node belonging to the same domain as access node 12.

Figure 2:
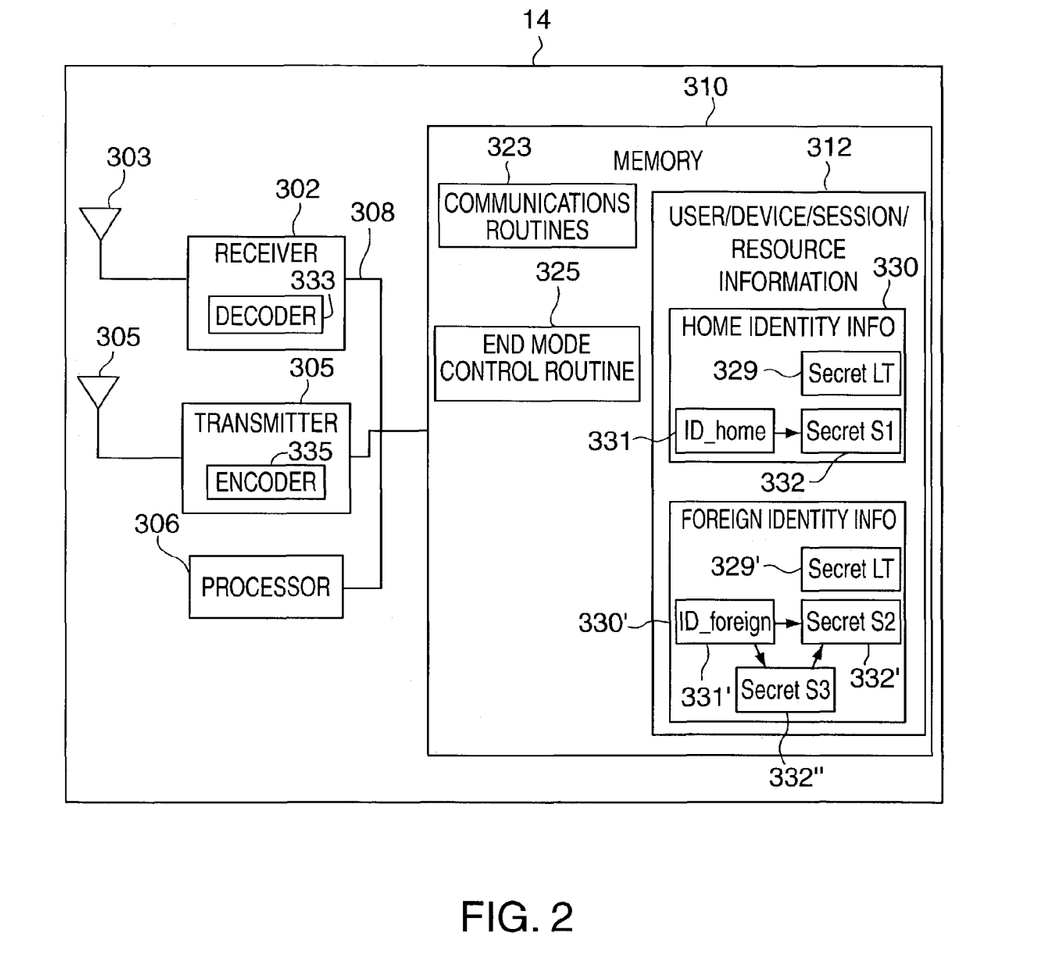
FIG. 2 illustrates an exemplary end node implemented in accordance with the present invention.

FIG. 2 illustrates an exemplary end node 14 implemented in accordance with the present invention. The end node 14 may be used by a user as a mobile terminal (MT). The end node 14 includes receiver and transmitter antennas 303, 305 which are coupled to receiver and transmitter circuitry 302, 304 respectively. The receiver circuitry 302 includes a decoder 333 while the transmitter circuitry 304 includes an encoder 335. The receiver transmitter circuits 302, 304 are coupled by a bus 308 to a memory 310 and processor 306. Processor 306, under control of one or more routines stored in memory 310, causes the end node 14 to operate in accordance with the methods of the present invention. In order to control operation of the end node 14, memory 310 includes communications routine 323 and end node control routine 325. The end node communications routine 323 is used for controlling the end node 14 to perform various communications operations and implement various communications protocols. The end node control routine 325 is responsible for insuring that the end node operates in accordance with the methods of the present invention and performs the steps described in regard to end node operations and signalling. The memory 310 also includes user/device/session/resource information 312 which may be accessed and used to implement the methods of the present invention and/or data structures used to implement the invention. In particular, User/Device/Session/Resource information 312 includes home identity information 330 and foreign identity information 330'. This information 330 can be in the form of an identifier, ID_home, 331 associated in memory with a secret S1 332, and foreign identity information 330' can be in the form of an identifier ID_foreign 331' associated in memory with another secret S2 332'. Arrows are used in FIG. 2 to show the association between the identifiers 331, 331' and the corresponding secrets. Secret S1 332 and Secret S2 332' may be, e.g., encryption keys or may be, e.g., information from which encryption keys can be derived in accordance with the present invention. For example secret S1 332 may be a home session (HS) key while secret S2 may be a Roaming session (RS) key. In addition to the RS key 332' the end node may store a third secret 332", e.g., a foreign session (FS) key which is associated with the foreign ID 331' and which is derived from the second secret S2 332'. In some cases the RS key is used as the third secret 332". The home identity information 330 may include secret lifetime information 329 which indicates the lifetime of secret S1 332. Similarly, foreign identity information 330' normality includes secret lifetime information 329' which indicates the lifetime of secrets S2 332' and S3 332". In an alternative embodiment secrets S2 332' and S3 332" have separate lifetimes.

Home identity information 330 (331, 332) is used to identify the end node when requesting access to a network via an access node like the one depicted in FIG. 1. Using home identity information 330 (331, 332), the end node 14 can participate in authentication processes according to this invention which result in the creation and subsequent use of foreign identity information 330' (331', 332') when the end node is in a foreign domain and according to this present invention.

Figure 3:
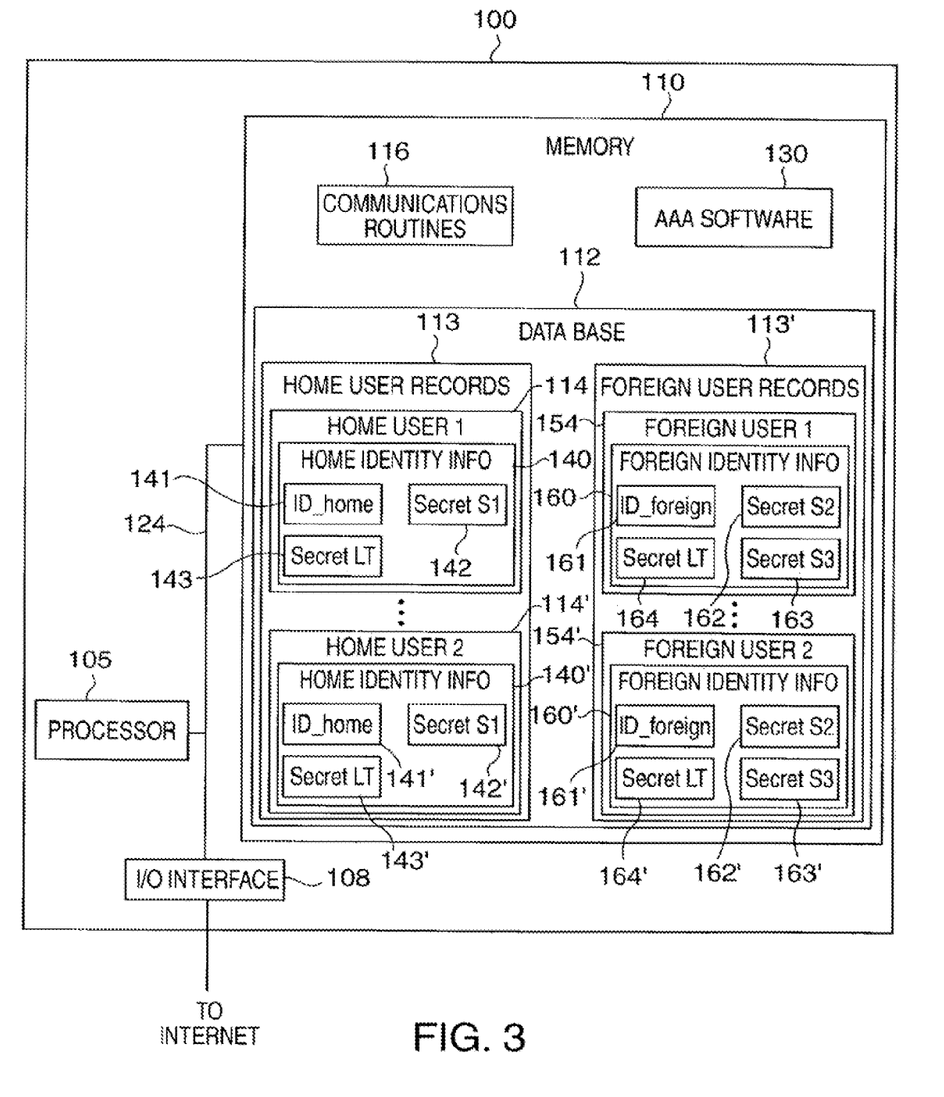
FIG. 3 illustrates an exemplary Authentication Authorization and Accounting (AAA) node implemented in accordance with the present invention.

FIG. 3 illustrates an exemplary AAA Server node 100, implemented in accordance with the invention. The AAA Server node 100 includes I/O interface 108 which couples the AAA Server node 100 to the Internet. The I/O interface 108 is coupled by a bus 124 to a processor, e.g., CPU, 105 and memory 110. The memory 110 includes routines, which when executed by the processor 105, cause the AAA Server node 100 to operate in accordance with the invention. Memory 110 includes communications routines 116 used for controlling the AAA Server node 100 to perform various communications operations and implement various communications protocols. The memory 110 also includes a AAA Server software module 130 used to provide authentication, authorization and accounting services. AAA Server software module 130 operates in accordance with this invention as described in detail below. Memory 110 also includes information used by communications routines 116, and AAA Server software module 130. The information is located in a database 325 which includes home user records 113 and foreign user records 113'. The database 112 may be internal to the AAA server node 100 as shown in FIG. 3 or external with database communication protocols used to transfer information and data between the AAA server node 100 and said database 112. In the FIG. 4 embodiments of AAA server's at least a portion of the database 112 is maintained externally to the AAA servers. The home user records 113 include user records for authentication, authorization and accounting functions including user's identification and secret information as well as policy regarding services and resources they are allowed to use as well as what type of accounting should be observed when said users are accessing the network. Home user records 113 include a plurality of information about home users, e.g., mobile terminals. In the exemplary, AAA server 100 of FIG. 3, home user records 113 includes information about home user 1 114 and information about home user 2 114'. In FIG. 3, information about home user 1, 114, includes home identity information 140. Home identity information 140 includes an identifier, ID_home 141 e.g., a home NAI, a secret S1 142, and secret lifetime information 143. Information about home user 2 114' includes home identity information 140' which can be in the form of an identifier ID_home 141', secret S1 142' and secret lifetime information 143'.

Foreign user records 113' include similar information to the information included in the home user records 113, but they are created dynamically in accordance with the present invention as described below. Foreign user records 113' include a plurality of information about foreign users, e.g., visiting mobile terminals. In the exemplary AAA server 100 of FIG. 3, foreign user records 113' include information about foreign user 1 154 and information about foreign user 2 154'. In FIG. 3, information about foreign user 1 154, includes foreign identity information 160. Foreign identity information 160 includes, e.g., an identifier ID_foreign 161, e.g., an NAI corresponding the foreign user 1 MT in the foreign domain, and a corresponding secret S2 162 and a corresponding secret S3 163 along with secret lifetime information 164. Secret S2 and S3 may be, e.g., a RS key and a FS key, respectively. Information 164 may indicate different lifetimes for the RS and FS keys. Information about foreign user 2 154', includes foreign identity information 160'. Foreign identity information 160' includes information of the same type as included in information 160 but relates to the second user, e.g., a visiting end node other than the foreign user 1 end node. The foreign identity information 160' includes an identifier ID-foreign 161' and secrets 162', 163', 164'.

Figure 4:
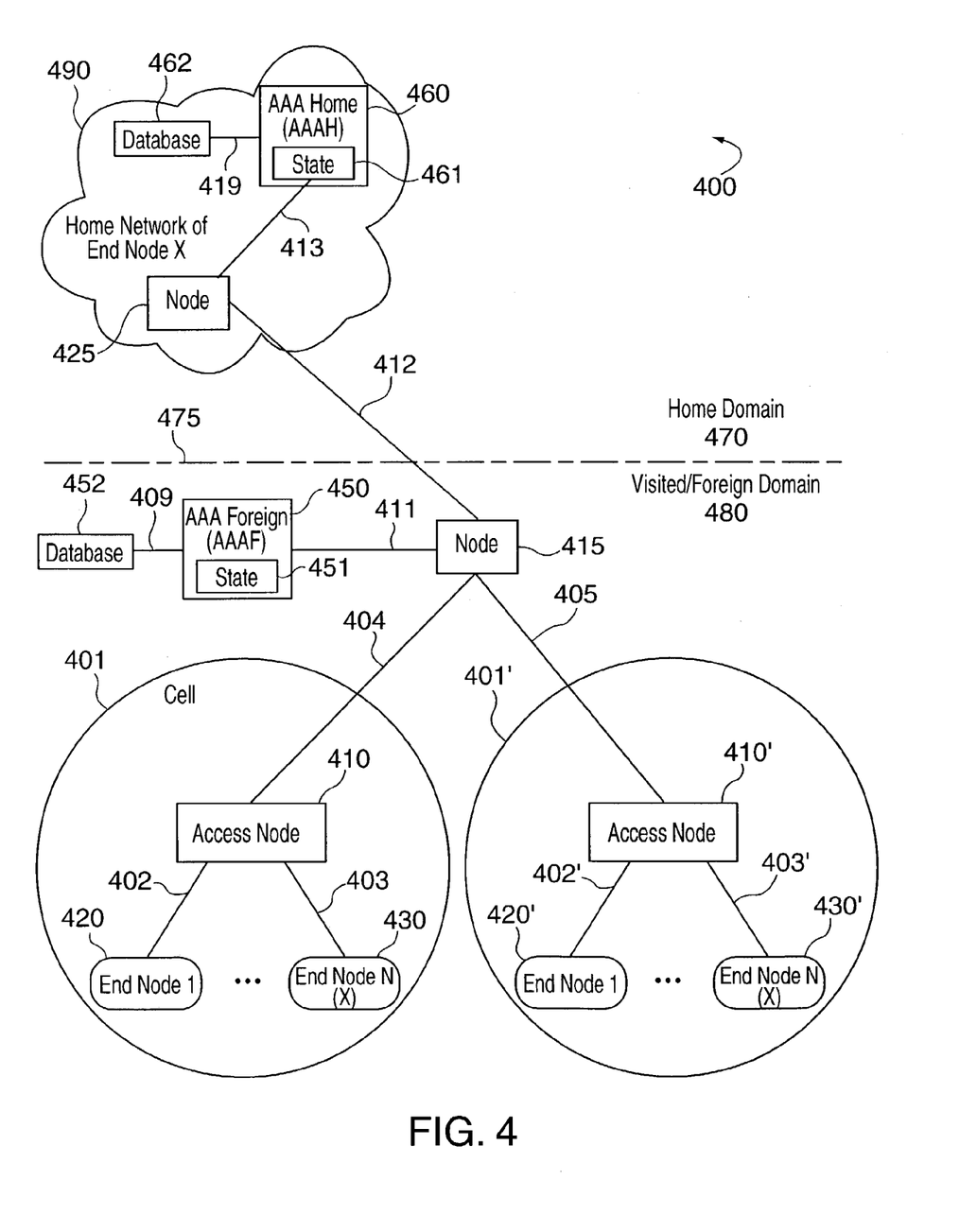
FIG. 4 illustrates a network diagram of an exemplary communications system in which the invention is applicable.

FIG. 4 illustrates an exemplary system 400 including two domains, a visited, e.g., foreign, domain 480 and a home domain 470 separated by dashed line 475. Terms home and foreign are used with respect to exemplary end node N 430 which belongs to domain 470. Thus domain 470 is the home domain of end node 430. End node N 430 is shown visiting foreign domain 480 for the purpose of explaining the present invention. System 400 comprises a plurality of access nodes 410, 410' implemented in accordance with the present invention. FIG. 4 also depicts communication cells 401, 401' surrounding each access node 410, 410', respectively, which represents the coverage area of corresponding access node 410, 410', respectively. The same physical and functional elements are depicted in each of the communication cells, 401, 401' thus the following description of the elements in the cell 401 surrounding access node 410 is directly applicable to each of the cells 401, 401'. The depiction of the access node 410 is a simplified representation of the access node 12 depicted in FIG. 1. FIG. 4 illustrates the access node 410 providing connectivity to a plurality of N end nodes 420, 430 via corresponding access links 402, 403. End nodes 420, 430 are simplified versions of the end node 14 depicted in FIG. 2. FIG. 4 also illustrates the access node 410' providing connectivity to a plurality of N end nodes 420', 430' via corresponding access links 402', 403'.

Interconnectivity between the access nodes 410, 410' is provided through network links 404, 405 and an intermediate network node 415. The intermediate network node 415 also provides interconnectivity via link 411 to a AAA Server 450, serving as a AAA server for the foreign domain 480. AAA Server 450 is a simplified version of the AAA Server 100 depicted in FIG. 3 with a portion of the database 112 stored external to the AAA server 450 in database 452. In FIG. 4, AAA Server 450 is shown to include state 451 and is connected to database 452 via link 409. Database 452 includes user profile, identity and secret information.

Home network 490 in the home domain 470 is connected to foreign network 480 via link 412 and node 415. In particular, home network 490 includes network node 425 connected to link 412. Home Network 430 further includes AAA Server 460 operating as Home AAA server of domain 470 connected to network node 425 via link 413. In FIG. 4, AAA Server 460 is shown to include state 461 and is connected to a database 462 via link 419. Database 462 includes user profile, identity and secret information.

Figure 5:
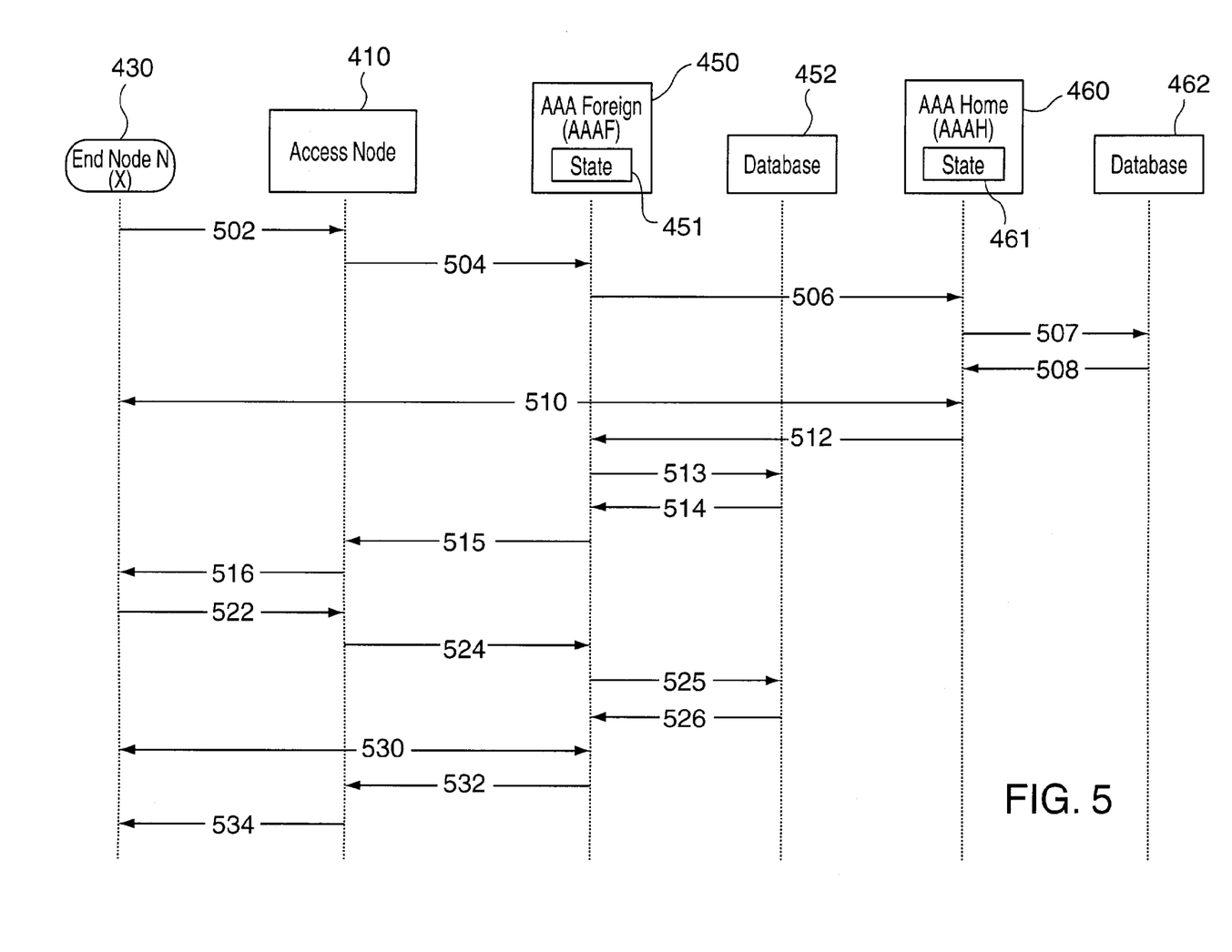
FIG. 5 illustrates signalling and operations associated with the authentication of an end node in two phases and the creation of its temporary foreign identity in accordance with this invention.

FIG. 5 illustrates an exemplary message exchange according to the present invention between end node X 430, Access Node 410, AAAF Server 450, database 452, AAAH Server 460 and database 462 of FIG. 4. The messaging is illustrated in a ladder diagram for purposes of explaining the invention.

End node 430 is identified with a home network access identifier (NAI_home) which includes a username part and a realm part. The NAI_home may be in the form username@home_realm where home_realm is the realm of the home domain 470 of FIG. 4 and username is the username corresponding to end node X 430. End node X 430 sends a connect request message 502 including its NAI_home to access node 410, requesting network access.

Access node 410 checks in its memory 210 of FIG. 1 to find state regarding said end node 430. Assuming it does not find any corresponding state, e.g., because message 502 corresponds to an initial request, access node 410 sends access request message 504 to its local AAA Server, in this case AAAF 450. The access request message 504 includes the NAI_home of end node 430 which was included in message 502.

On reception of access request message 504, AAAF 450 checks the realm part of NAI_home included in message 504 and recognizes the realm part of said NAI_home as not belonging to its own domain. Using AAA routing, e.g., a lookup table with routing information for realms other than domain 480, the AAAF 450 forwards access request message 506 to the AAA server responsible for the realm part of the NAI_home, in this case AAAH 460.

On reception of access request message 506, AAAH 460 checks the realm part of NAI_home included in message 506 and recognizes the realm part of said NAI_home as belonging to its own domain. AAAH 460 sends read message 507 to its database 462 including NAI_home from message 506 and receives the end node's record in read response message 508 from database 462. The record, typically includes the required security procedures for authenticating an end node as well as an authorization profile for said end node. For illustration purposes, we assume that the Extensible Authentication Protocol (EAP) is used to authenticate the end node but this invention does not depend on the use of EAP and other protocols could be used. Thus, AAAH 460 initiates EAP message exchange with appropriate EAP method. The EAP exchange between AAAH 460 and end node 430 is represented by double-sided arrow 510.

In an alternative embodiment of the invention, the EAP method is initiated by the message 504 from the access node which includes the identity (NAI_home) of the end node.

According to this present invention, at the end of a successful EAP exchange 510, the end node 430 is successfully authenticated to AAAH 460, and vice versa if mutual authentication was used, and at least one key, a roaming session (RS) key, was generated by both ends of the EAP exchange for the purpose of being shared between end node 430 and the visited/foreign domain 480 of FIG. 4, in which the end node 430 happens to be in at the moment. The RS key generated by AAAH 460 is normally generated from the shared secret stored in the AAAH and also in the mobile terminal but not in the AAAF.

AAAH 460 generates and sends Access_Accept message 512 to the originating AAAF 450 including NAI_home of end node 430, the authorization profile of said end node and at least the RS key to be shared between end node 430 and AAAF 450. Message 512 also includes lifetime information which indicates the lifetime assigned to the RS key after which the RS key is invalid and, if still needed, should be re-generated. Length of the RS key lifetime is based on policy and security requirements of AAAH 460 but is normally no longer than the lifetime of the session shared secret from which the RS key was generated by the AAAH.

According to this invention on reception of message 512 AAAF 450, extracts the NAI_home, the authorization profile and the RS key from message 512 and creates a record in its database 452, e.g., a new foreign user record 154 of the type shown in FIG. 3. According to this invention AAAF 450 also generates an NAI to be used by end node 430, e.g., when obtaining access to one or more services in the foreign domain 480 of FIG. 4. The newly created foreign user record in database 452 includes, and is searchable via, this new foreign NAI referred to from now on as NAI_foreign. Exemplary methods for generating the foreign NAI, NAI_foreign, are discussed later on in this patent application.

The new foreign user record is created with write message 513 being sent to the AAAF's database 452. The message 513 includes the NAI_foreign, the RS key, the NAI_home and the authorization profile. The database 452 responds with write accept message 514 which is sent to AAAF 450. Message 514 confirms the creation of the record corresponding to NAI_foreign.

In an alternative embodiment of this invention, the AAAF 450 modifies the authorization profile of the user received from AAAH 460 in message 512 before including it in message 513 to the database 452. Said modifications reflect local policy in terms of what a roaming end node like, e.g., end node 430 is authorized to do in domain 480 of FIG. 4. As an example, the authorization profile returned from AAAH 460 for end node 430 may, and in some embodiments does, include authorization for use of multicast services. If however, according to roaming agreements, local policy multicast services are not granted to roaming end nodes, in such a case AAAF 450 removes the corresponding part of the authorization profile before storing it in its database 452. In one embodiment of the invention, policy is local to AAAF 450, while in another embodiment, policy follows, i.e., is determined in accordance with, bilateral agreements between domain 470 and domain 480.

On reception of message 514, AAAF 450 sends access accept message 515 to access node 410. Message 515 includes the NAI_foreign assigned to end node 430. In one embodiment of the invention, message 515 includes a code indicating that authentication was successful, but end node 430 should assume a new identity indicated by NAI_foreign.

On reception of message 515, access node 410 sends a connect granted message 516 to end node 430 including said code and NAI_foreign from message 515. This message 516 confirms that authentication was completed successfully and that end node 430 should now assume a new identity using the assigned foreign network identifier NAI_foreign, in order to access services in the foreign domain.

According to this invention on reception of message 516, end node 430 extracts and stores the NAI_foreign in its foreign identity record 330' together with the RS key derived earlier.

At this stage and according to this present invention, end node 430 has a new identity, i.e.: NAI_foreign, in visited/foreign domain 480 of FIG. 4 and shares a secret with the domain 480. Now, security requirements in this foreign domain 480 can be implemented independently from home domain 470, and authentication and security association required in the foreign domain 480 can be enforced and derived with the sole participation of end node 430 and elements in foreign domain 480, such access node 410 and AAAF 450. As part of this second AAA process, the NAI_foreign may be, and normally is used as an MT identifier, e.g., particularly where the MT is a device corresponding to an individual user.

The description below, based on FIG. 5, illustrates one exemplary usage of the NAI_foreign identity and RS key of end node 430 in the foreign domain 480 of FIG. 4.

In one embodiment of this invention, end node 430 sends a new connect request message 522 including its new identifier, NAI_foreign, requesting access to the network. The process, as described previously above, restarts, but due to the new identity, the process continues somewhat differently.

Specifically, on reception of message 522, access node 410 checks in its memory 210 of FIG. 1 to find state regarding said end node 430 and since it does not find any state (e.g., since this is an initial access request using NAI_foreign) access node 410 sends Access_Request message 524 to its local AAA Server, in this case AAAF 450. Said Access_Request message 524 includes NAI_foreign of end node 430.

On reception of Access_Request message 524, AAAF 450 checks the realm part of NAI_foreign included in message 504 and recognises the realm part of said NAI_home as belonging to its own domain.

AAAF 450 sends read message 525 to its database 452 including NAI_foreign from message 524 and receives the end node's record in read response message 526 from database 452. The record, typically includes the required security procedures for authorizing an end node as well as an authorization profile for said end node. For illustration purposes we will assume that the Extensible Authentication Protocol (EAP) is used to authenticate the end node 430. Thus, AAAF 450 initiates EAP message exchange with appropriate, for the foreign domain 480 of FIG. 4, EAP method. The EAP exchange between AAAF 450 and end node 430 is represented by double-sided arrow 530.

At the end of a successful EAP exchange 530 the end node 430 is successfully authenticated by AAAF 450, and vice versa if mutual authentication was used. AAAF 450 sends an access accept message 532 to access node 410. Message 532 includes the NAI_foreign assigned to end node 430 and the authorization profile for said end node.

On reception of message 532, access node 410 extracts and stores in its memory 210 information 212, including the end node identifier, NAI_foreign, and the authorization profile of end node 430 included in said message 532. Access node 410 also sends a connect granted message 534 to end node 430 confirming that authentication was successful and that access was granted.

The foreign network access identifiers used to identify end nodes when in a foreign domain may be generated in a plurality of ways. In one embodiment of this invention the NAI_foreign is generated by making a user part, e.g., a user name, equal to the whole of the NAI_home (username@home_realm) of end node 430 but replacing the character @ to another character such as % so that the new username is username%home_realm. Then, appending this username with the realm of the foreign domain 480 of FIG. 4, which results in the NAI_foreign being:

username%home_realm@foreign_realm

In an alternative embodiment, the NAI_foreign is derived by amending the foreign_realm to a concatenation of an identifier used to identify AAAF Server 450 and a sequence number of sufficient size incremented for each new account created by said AAAF 450. The resulting NAI_foreign is:

AAAF-ID_Number@foreign_realm

In another embodiment of this invention, the NAI_foreign is derived by amending the foreign_realm to a pseudorandom string generated out of a keyed one way hash function using the RS key and a locally generated challenge, e.g.: a random or pseudo random number.

Username=PRF (challenge, RS)

In this case the NAI_foreign is not returned to end node 430. Instead, only the challenge and the realm_foreign are returned. End node 430 then applies the PRF with the RS key and the received challenge to recreate the username part of the NAI_foreign.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A communications method for use in a communications network including a mobile node, a first security device and a second security device, said mobile node being identified in a home region of said communications network by a first identifier, said second security device being in a foreign region of said communications network, the method comprising:
    operating the second security device to:
        transmit a signal including said first identifier to the first security device, said first identifier including a first realm associated only with said home region;
        receive a first secret in response to said transmitted signal including said first identifier;
        generate a second identifier to identify said mobile node in said foreign region, said second identifier including a second realm associated only with said foreign region, wherein the second identifier further includes a username of the first identifier, and further includes the first realm; and
        associate said second identifier with said first secret.

2. The communications method of claim 1, wherein associating the second identifier with said first secret includes storing said second identifier in a database with said first secret.

3. The method of claim 2, further comprising:
    operating the second security device to store user profile information associated with said second identifier.

4. The method of claim 3, further comprising:
    operating the second security device to store said first identifier in association with said second identifier and said user profile information.

5. The method of claim 4, wherein said first and second identifiers are network access identifiers (NAI) and wherein said first and second security devices are servers which perform authentication operations.

6. The method of claim 3 wherein the first security device is located in said home region, the method further comprising operating the first security device to:
    access a second secret associated with said first identifier; and
    generate said first secret from said second secret.

7. The method of claim 6, wherein said generation of said first secret from said second secret is part of a mutual authentication operation between said mobile node and said first security device.

8. The method of claim 6, further comprising:
    operating the first security device to transmit said first secret along with user profile information to said second security device.

9. The method of claim 8, further comprising:
    operating the first security device to transmit first secret lifetime information along with said first secret.

10. The method of claim 9, further comprising operating the second security device, prior to expiration of the first secret lifetime indicated by said first secret lifetime information, to:
    transmit another signal including said first identifier to the first security device;
    receive a third secret in response to said transmitted another signal; and
    associate said second identifier with said third secret.

11. The method of claim 2, further comprising:
    operating said second security device to generate said second identifier prior to associating said second identifier with said first secret.

12. The method of claim 11, further comprising:
    operating said second security device to communicate said second identifier to said mobile node.

13. The method of claim 12, further comprising:
    operating said second security device to communicate lifetime information associated with said second identifier to said mobile node.

14. The method of claim 11, further comprising:
    operating said mobile node to generate said second identifier.

15. The method of claim 14, further comprising the generation of said second identifier out of an operation that involves the said first secret and a random number information sent by second security device to the mobile node.

16. The method of claim 15, wherein said operation is a keyed one-way hash function.

17. The method of claim 2, further comprising:
    operating said mobile node, while located in said foreign region, to transmit a first signal including said first identifier, said second security device transmitting said first identifier to said first security device in response to the transmission of said first signal by said mobile node.

18. The method of claim 17, further comprising:
    operating said mobile node to transmit a second signal, the second signal including said second identifier; and
    operating the second security device to perform an authentication operation using said first secret in response to said second signal.

19. The method of claim 18, further comprising, as part of said authentication operation, operating the second security device to generate at least one additional secret from said first secret; and
    subsequently using said additional secret to authorize a communications service provided to said mobile node.

20. The method of claim 1, wherein said first secret is a key, the method further comprising:
    operating said second security device to transmit information specifying the format of at least a portion of said key to said first security device.

21. The method of claim 20, wherein said information specifying the format also specifies the length of said key.

22. The method of claim 20, further comprising:
    operating the second security device to transmit information to said first security device, said information specifying the manner in which said key is to be generated.

23. The communications method of claim 1, wherein the second realm consists of the "@" symbol concatenated with a domain name associated with the second security device.

24. A communications network for use with a mobile node, the communications network comprising:
    a home region including a first security system, said mobile node being associated with said home region and being identified in said home region by a first identifier including a first realm associated only with said home region, said first security system storing said first identifier and a first secret known to both said mobile node and said first security system; and a foreign region including a second security system, said mobile node being located in said foreign region for a period of time, the second security system being coupled to said first security system, said second security system including: said first identifier, a second secret generated from said first secret by said first security system and supplied to said second security system, and a second identifier, generated by said second security system, to identify said mobile node to said second security system, the second identifier including a second realm associated only with said foreign region, wherein the second identifier further includes a username of the first identifier, and further includes the first realm.

25. The communications network of claim 24, wherein said home region includes a home agent, wherein said foreign region includes a visited network, wherein said second security system is a security server in the visited network and wherein said first security system is a first security server in the home region.

26. The communications network of claim 25, wherein said second security system includes:
means for communicating said second identifier to said mobile node.

27. The communications network of claim 26, wherein said mobile node includes:
means for initiating an access request using said second identifier in said foreign domain following receipt of said second identifier.

28. The communications network of claim 24, wherein said first and second identifiers are network access identifiers.

29. The communications network of claim 24, wherein said first security system includes means for generating said second secret in response to a message from said second security system including said first identifier.

30. The communications network of claim 24, wherein the second realm consists of the "@" symbol concatenated with a domain name associated with the second security system.

31. A non-transitory computer readable medium including machine executable instructions for controlling a second security device to implement a communications method in a communications network including a mobile node, a first security device and said second security device, said mobile node being identified in a home region of said communications network by a first identifier, said second security device being in a foreign region of said communications network, the computer readable medium comprising:
instructions for causing the second security device to transmit a signal including said first identifier to the first security device, said first identifier including a first realm associated only with said home region;
instructions for causing the second security device to receive a first secret in response to said transmitted signal including said first identifier;
instructions for causing the second security device to generate a second identifier to identify said mobile node in said foreign region, said second identifier including a second realm associated only with said foreign region, wherein the second identifier further includes a username of the first identifier, and further includes the first realm; and
instructions for causing the second security device to associate said second identifier with said first secret.

32. The computer readable medium of claim 31, wherein said instructions for causing the second security device to associate the second identifier with said first secret further causes storing said second identifier in a database with said first secret.

33. The computer readable medium of claim 32, further comprising machine executable instructions for causing said second security device to store user profile information and to associate the stored user profile information with said second identifier.

34. The computer readable medium of claim 33, wherein the computer readable medium further includes machine executable instructions for causing said second security device to:
store said first identifier in association with said second identifier and said user profile information.

35. The computer readable medium of claim 34, wherein said first and second identifiers are network access identifiers (NAI) and wherein said first security device and said second security device are servers which perform authentication operations.

36. The computer readable medium of claim 22, wherein the second realm consists of the "@" symbol concatenated with a domain name associated with the second security device.

37. A second security device including a processor configured to control said second security device to implement a communications method in a communications network including a mobile node, a first security device and said second security device, said mobile node being identified in a home region of said communications network by a first identifier, said second security device being in a foreign region of said communications network, the processor being configured to:
transmit a signal including said first identifier to the first security device, said first identifier including a first realm associated only with said home region;
receive a first secret in response to said transmitted signal including said first identifier;
generate a second identifier to identify said mobile node in said foreign region, said second identifier including a second realm associated only with said foreign region, wherein the second identifier further includes a username of the first identifier, and further includes the first realm; and
associate said second identifier with said first secret.

38. The second security device of claim 37, wherein associating the second identifier with said first secret includes storing said second identifier in a database with said first secret.

39. The second security device of claim 38, wherein the processor is further configured to:
store user profile information and associate the stored user profile information with said second identifier.

40. The second security device of claim 39, wherein the processor is further configured to:
store said first identifier in association with said second identifier and said user profile information.

41. The second security device of claim 40, wherein said first and second identifiers are network access identifiers (NAI) and wherein said first security device and said second security device are servers which perform authentication operations.

42. The second security device of claim 37, wherein the second realm consists of the "@" symbol concatenated with a domain name associated with the second security device.

43. A second security device for use in a communications network including a mobile node, a first security device and said second security device, said mobile node being identified in a home region of said communications network by a first identifier, said second security device being in a foreign region of said communications network, the second security device comprising:
- means for transmitting a signal including said first identifier to the first security device, said first identifier including a first realm associated only with said home region;
- means for receiving a first secret in response to said transmitted signal including said first identifier;
- means for generating a second identifier to identify said mobile node in said foreign region, said second identifier including a second realm associated only with said foreign region, wherein the second identifier further includes a username of the first identifier, and further includes the first realm; and
- means for associating said second identifier with said first secret.

44. The second security device of claim 43, further comprising:
- database means for storing information; and
- wherein said means for associating the second identifier with said first secret stores said second identifier in said database with said first secret.

45. The second security device of claim 44, further comprising:
- means for storing user profile information and associating the stored user profile information with said second identifier.

46. The second security device of claim 45, wherein said first and second identifiers are network access identifiers and wherein said first security device and said second security device are servers which perform authentication operations.

47. The second security device of claim 43, wherein the second realm consists of the "@" symbol concatenated with a domain name associated with the second security device.

48. A second security device for use in a communications network including a mobile node, a first security device and said second security device, said mobile node being identified in a home region of said communications network by a first identifier, said second security device being in a foreign region of said communications network, the second security device comprising:
- a transmitter module for transmitting a signal including said first identifier to the first security device, said first identifier including a first realm associated only with said home region;
- an interface module for receiving a first secret in response to said transmitted signal including said first identifier;
- a processor module for generating a second identifier to identify said mobile node in said foreign region, said second identifier including a second realm associated only with said foreign region, wherein the second identifier further includes a username of the first identifier, and further includes the first realm; and
- an authentication module for associating said second identifier with said first secret.

49. The second security device of claim 48, further comprising:
- memory for storing information; and
- wherein said second identifier is stored in a record with said first secret in said memory.

50. The second security device of claim 48, wherein the second realm consists of the "@" symbol concatenated with a domain name associated with the second security device.

* * * * *